US010539216B2

(12) United States Patent
Shirakawa

(10) Patent No.: US 10,539,216 B2
(45) Date of Patent: Jan. 21, 2020

(54) METHOD FOR MANUFACTURING DIFFERENTIAL DEVICE AND DIFFERENTIAL DEVICE

(71) Applicant: SUBARU CORPORATION, Tokyo (JP)

(72) Inventor: Yusuke Shirakawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 316 days.

(21) Appl. No.: 15/621,071

(22) Filed: Jun. 13, 2017

(65) Prior Publication Data

US 2018/0038466 A1 Feb. 8, 2018

(30) Foreign Application Priority Data

Aug. 8, 2016 (JP) .................................. 2016-155639

(51) Int. Cl.
*F16H 48/40* (2012.01)
*F16H 48/42* (2012.01)
*F16H 48/38* (2012.01)

(52) U.S. Cl.
CPC ............. *F16H 48/40* (2013.01); *F16H 48/42* (2013.01); *F16H 2048/382* (2013.01); *F16H 2048/385* (2013.01); *F16H 2048/405* (2013.01)

(58) Field of Classification Search
CPC .... F16H 48/40; F16H 48/42; F16H 2048/382; F16H 2048/385; F16H 2048/405
See application file for complete search history.

(56) References Cited

U.S. PATENT DOCUMENTS 9,120,184 B2 * 9/2015 Uchida ................ B23K 31/125
9,476,493 B2 * 10/2016 Yanase .................... B23K 31/02
2014/0179482 A1 6/2014 Uchida et al.

FOREIGN PATENT DOCUMENTS

| JP | 2013018035 A | 1/2013 |
| JP | 2016-065582 A | 4/2016 |
| WO | 2011089706 A1 | 7/2011 |
| WO | 2012143986 A1 | 10/2012 |
| WO | 2013/018223 A1 | 2/2013 |

OTHER PUBLICATIONS

Decision to grant for JP Patent Application No. 2016-155639, dated Apr. 3, 2018, 03 pages of Decision to Grant and 03 pages of English Translation.

* cited by examiner

*Primary Examiner* — Thomas C Diaz
(74) *Attorney, Agent, or Firm* — Chip Law Group

(57) ABSTRACT

A method for manufacturing a differential device includes a first step and a second step. The first step is to cast a differential case by pouring molten cast iron into, via a gate, a mold having, on a mold surface, a mark formation site that has a specific positional relationship to the gate. The second step is to fit the differential case with a ring gear and weld the differential case and the ring gear together entirely around a prescribed axis. In the second step, the differential case and the ring gear are welded together using a mark formed on the differential case by the mark formation site in the first step so that an overlap of welding does not occur in a portion of the differential case formed near the gate of the mold.

6 Claims, 9 Drawing Sheets

METHOD FOR MANUFACTURING DIFFERENTIAL DEVICE AND DIFFERENTIAL DEVICE

CROSS-REFERENCE TO RELATED APPLICATIONS

The present application claims priority from Japanese Patent Application No. 2016-155639 filed on Aug. 8, 2016, the entire contents of which are hereby incorporated herein by reference.

BACKGROUND

1. Technical Field

The present invention relates to a method for manufacturing a differential device and a differential device.

2. Related Art

A vehicle is provided with a differential device such as a front differential device or a rear differential device that, during turning etc., distributes the driving force outputted from the engine between the corresponding left and right driving wheels. As another aspect of the differential device, there is also a center differential device that distributes the driving force outputted from the engine between the front and rear driving wheels. The differential device includes a ring gear to which driving force is transmitted and a differential case that is joined to the ring gear and rotates fixedly with the ring gear. A joining method by welding is employed as a method for joining the ring gear and the differential case together. For example, beam welding is performed on the contact position between a ring gear made of carbon steel and a differential case cast using cast iron, and thereby the ring gear and the differential case are joined together.

Technologies for improving the strength of welding between the ring gear and the differential case are proposed. For example, Japanese Unexamined Patent Application Publication No. 2013-18035 discloses a differential device in which a gap is formed between the gear-side welding surface of a ring gear and the case-side welding surface of a differential case to allow the heat distortion of the ring gear to be absorbed and allow the residual stress of the welding bead to be reduced. The differential device further has a hollow through which welding gas generated during laser welding is discharged, and can thereby suppress the occurrence of weld defects.

Further, WO 2011/089706 discloses a welded structure of a differential device that has a penetration hole penetrating such that one end is open to a hollow for causing beam welding to function as penetration welding and the other end is open to the outer surface of a differential case, and that causes the air in the hollow that has expanded during beam welding to flow out to the external space and can thereby prevent weld defects. Further, WO 2012/143986 discloses a differential device that has an escape surface on an annular flange located on the inner peripheral side with respect to an annular contact site that is formed by one side surface of an annular flange of a differential case and a side surface of a flange of a ring gear, and that can suppress weld defects by releasing welding gas.

Here, in the case where the ring gear and the differential case are joined together by welding, cracking may occur in the differential case. The main factor of the cracking is that, during welding, a brittle structure is produced due to the dissolving-out of carbon contained in the cast iron. The vicinity of a gate through which molten cast iron is poured during casting is lower in cooling rate than other areas, and has a higher ratio of the pearlite structure having a relatively high carbon equivalent. Hence, an area of the differential case formed near the gate during casting is more likely to experience cracking during welding than other areas. In particular, in the case where the differential case and the ring gear are welded together over the entire periphery, when an overlap where the base point and the end point of welding overlap is located in the area formed near the gate, the amount of heat input to the area with a high pearlite ratio is increased, and structure embrittlement is expanded and cracking is likely to occur.

SUMMARY OF THE INVENTION

It is desirable to provide a new and improved method for manufacturing a differential device and a new and improved differential device that can suppress the cracking of a differential case caused by excessively large heat input due to an overlap of welding.

An aspect of the present invention provides a method for manufacturing a differential device, including: a first step of casting a differential case by pouring molten cast iron into, via a gate, a mold having, on a mold surface, a mark formation site that has a specific positional relationship to the gate; and a second step of fitting the differential case with a ring gear and welding the differential case and the ring gear together entirely around a prescribed axis. In the second step, the differential case and the ring gear are welded together using a mark formed on the differential case by the mark formation site in the first step so that an overlap of welding does not occur in a portion of the differential case formed near the gate of the mold.

In the second step, the differential case may be placed using the mark so that the portion formed near the gate of the mold is located in a specific position different from a starting position of the welding.

The mark may be a notch provided on a part of an outer peripheral surface of a cylinder of the differential case to be fitted with the ring gear. In the second step, the differential case may be held by a jig having a positioning site capable of being fitted with the notch and the differential case may be placed in a prescribed place, and thereby the portion formed near the gate of the mold may be located in the specific position different from the starting position of the welding.

Another aspect of the present invention provides a differential device including: a differential case made of a casting containing cast iron as a main component; and a ring gear that has an opening with which a cylinder of the differential case is fitted and is welded with the differential case entirely around a prescribed axis. In the differential case, a pearlite ratio is higher in a partial area in a round direction of the cylinder than in another area, and the differential case has a mark having a specific positional relationship to the area where the pearlite ratio is higher. An overlap where a base point and an end point of the welding overlap is located in an area different from the area where the pearlite ratio is higher.

The mark may be a notch provided on a part of an outer peripheral surface of the cylinder.

A space may be provided between a fitting site where the differential case and the ring gear are fitted together and a welding site where the differential case and the ring gear are welded together. The space may communicate with an outside via the notch as the mark.

DETAILED DESCRIPTION

Figure 1:
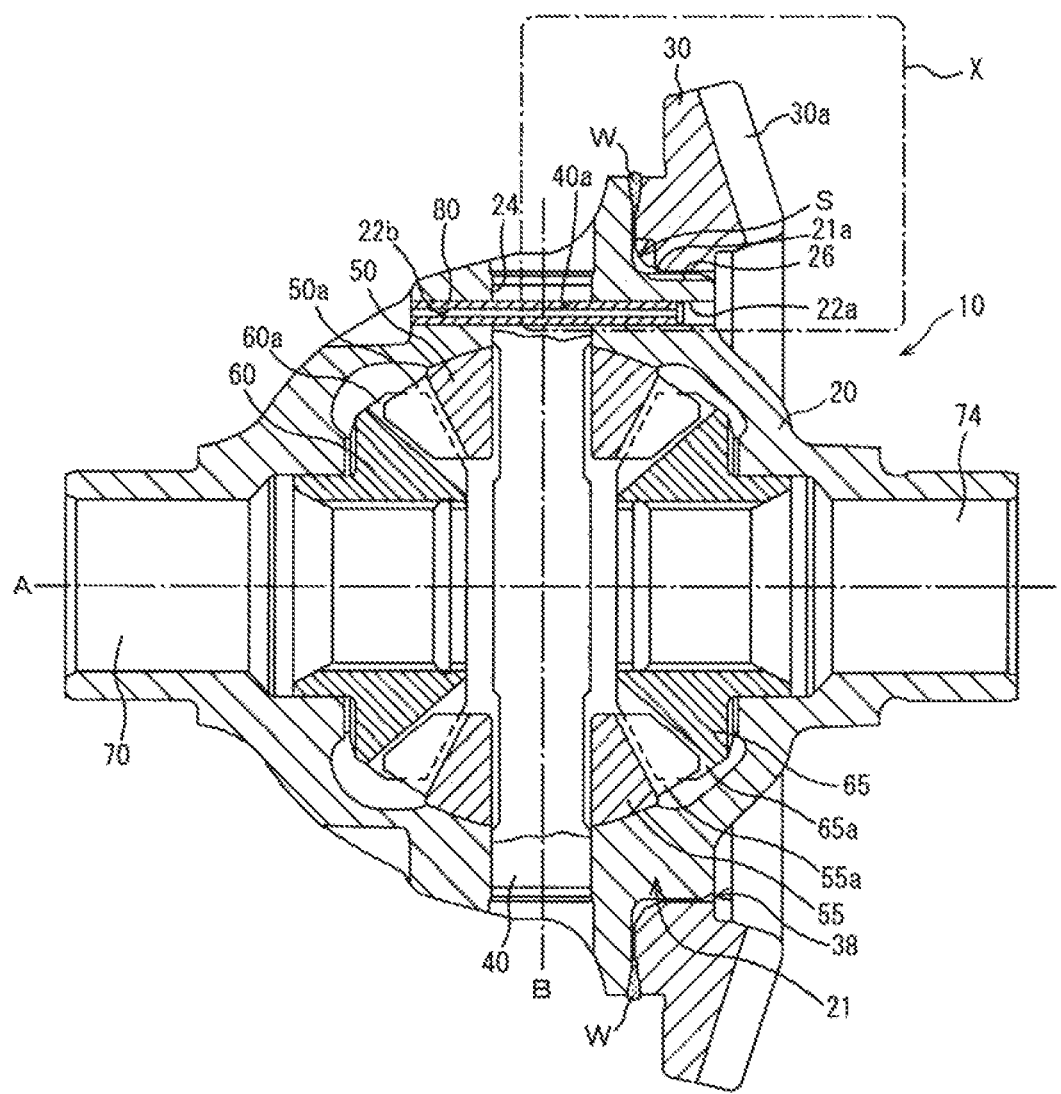
FIG. 1 is a cross-sectional view illustrating a differential device according to an example of the present invention.

Hereinafter, preferred examples of the present invention will be described in detail with reference to the appended drawings. Note that, in this specification and the appended drawings, structural elements that have substantially the same function and structure are denoted with the same reference numerals, and repeated description of these structural elements is omitted.

<1. Differential Device>
(1-1. Overall Configuration)

First, an example of the configuration of a differential device according to an example of the present invention is described. FIG. 1 is a cross-sectional view illustrating an example of the configuration of a differential device 10. FIG. 1 illustrates a cross section including the rotation axis line A of a differential case 20 and a ring gear 30 and the rotation axis line B of a pinion bevel gear 50. The differential device 10 is fixed to a transmission apparatus of a vehicle, and is used as a device that distributes the driving force outputted from an internal combustion engine to the left and right driving wheels, for example.

The differential device 10 according to the present example includes the differential case 20, the ring gear 30, a pinion shaft 40, pinion bevel gears 50 and 55, and side bevel gears 60 and 65. The differential case 20 is supported in a not-illustrated housing in an axially rotatable manner around the rotation axis line A. The differential case 20 has a cylinder 21 fitted with an opening 38 of the ring gear 30. The differential case 20 and the ring gear 30 fitted together are welded together in a welding site W. The tooth surface 30a of the ring gear 30 is in gear with the tooth surface of a pinion gear that is permanently affixed to a not-illustrated propeller shaft, and the driving force from the internal combustion engine is transmitted to the ring gear 30 via the propeller shaft. Thereby, the differential case 20 is driven in an axially rotatable manner around the rotation axis line A by the driving force from the internal combustion engine.

The pinion shaft 40 having an axis line B along a direction orthogonal to the rotation axis line A is supported by the differential case 20. The pinion shaft 40 is inserted in a shaft support hole 24 provided in the differential case 20. The differential case 20 has pin insertion holes 22a and 22b, and the pinion shaft 40 has a pin insertion hole 40a. A detachment prevention pin 80 is press-fitted so as to penetrate through the pin insertion holes 22a and 22b, and 40a, and the detachment of the pinion shaft 40 from the differential case 20 is prevented. A fitting pin having a C-shaped cross section may be used as the detachment prevention pin 80, for example.

The pair of pinion bevel gears 50 and 55 are supported by the pinion shaft 40 in an axially rotatable manner around the pinion shaft 40. The pair of pinion bevel gears 50 and 55 are placed on both sides across the rotation axis line A. Each of the pair of pinion bevel gears 50 and 55 axially rotates around the rotation axis line B orthogonal to the rotation axis line A.

Although the pair of pinion bevel gears 50 and 55 are supported by one pinion shaft 40 in the differential device 10 illustrated in FIG. 1, a pinion shaft may be provided for each of the pinion bevel gears 50 and 55. In this case, two or more sets of a pinion bevel gear and a pinion shaft may be provided.

The tooth surfaces 60a and 65a of the pair of left and right side bevel gears 60 and 65 are in gear with the tooth surfaces 50a and 55a of the pair of pinion bevel gears 50 and 55. A not-illustrated driving shaft (axle drive shaft) that rotationally drives the left driving wheel is spline-fitted with the side bevel gear 60 on the left side in the drawing, and a not-illustrated driving shaft (axle drive shaft) that rotationally drives the right driving wheel is spline-fitted with the side bevel gear 65 on the right side in the drawing. The left and right driving shafts are supported in an axially rotatable manner by driving shaft support holes 70 and 74 provided in the differential case 20.

The pair of side bevel gears 60 and 65 axially rotate around the rotation axis line A in common with the differential case 20 by the driving force of the internal combustion engine transmitted via the ring gear 30, the differential case 20, and the pinion bevel gears 50 and 55. All of the differential case 20, the ring gear 30, the side bevel gears 60 and 65, and the not-illustrated driving shafts (axle drive shafts) are axially rotatable around the rotation axis line A. The pinion bevel gears 50 and 55 are axially rotatable around the rotation axis line B, and are revolvable around the rotation axis line A. The differential case 20 and the side bevel gears 60 and 65 are relatively rotatable, and the pinion bevel gears 50 and 55 and the side bevel gears 60 and 65 are relatively rotatable.

When driving force is transmitted to the ring gear 30 from the internal combustion engine, the differential case 20 axially rotates around the rotation axis line A, and also the pair of pinion bevel gears 50 and 55 supported by the pinion shaft 40 fixed to the differential case 20 revolve around the rotation axis line A. When there is no rotation difference between the left and right driving wheels (during the straight movement of the vehicle etc.), the differential device 10 transmits the driving force equally to the pair of left and right side bevel gears 60 and 65. At this time, the rotation rates of the pair of left and right side bevel gears 60 and 65 are equal, and accordingly the pinion bevel gears 50 and 55 revolve around the rotation axis line A without axially rotating around the rotation axis line B.

On the other hand, when there is a rotation difference between the left and right driving wheels (during the turning of the vehicle etc.), the differential device 10 distributes the driving force appropriately to the pair of left and right side bevel gears 60 and 65. For example, when the vehicle turns to the left and the rotation rate of the right driving wheel is larger than the rotation rate of the left driving wheel, the side bevel gear 65 with which the driving shaft of the right driving wheel is fitted tends to rotate faster than the differential case 20, and the side bevel gear 60 with which the driving shaft of the left driving wheel is fitted tends to rotate more slowly than the differential case 20. At this time, the pinion bevel gears 50 and 55 axially rotate around the rotation axis line B while revolving around the rotation axis line A, and the difference in rotation rate between the left and right driving wheels is absorbed.

In the differential device 10, the ring gear 30, the pinion bevel gears 50 and 55, and the side bevel gears 60 and 65 are formed of, for example, carbon steel in order to ensure the accuracy of the engagement of the tooth surfaces. The differential case 20 is formed by casting using cast iron. In the case where the differential device 10 is a center differential device that distributes the driving force to the front and rear driving shafts, each of the side bevel gears 60 and 65 is fitted with the front-side driving shaft or the rear-side driving shaft.

(1-2. Joint)

Figure 2:
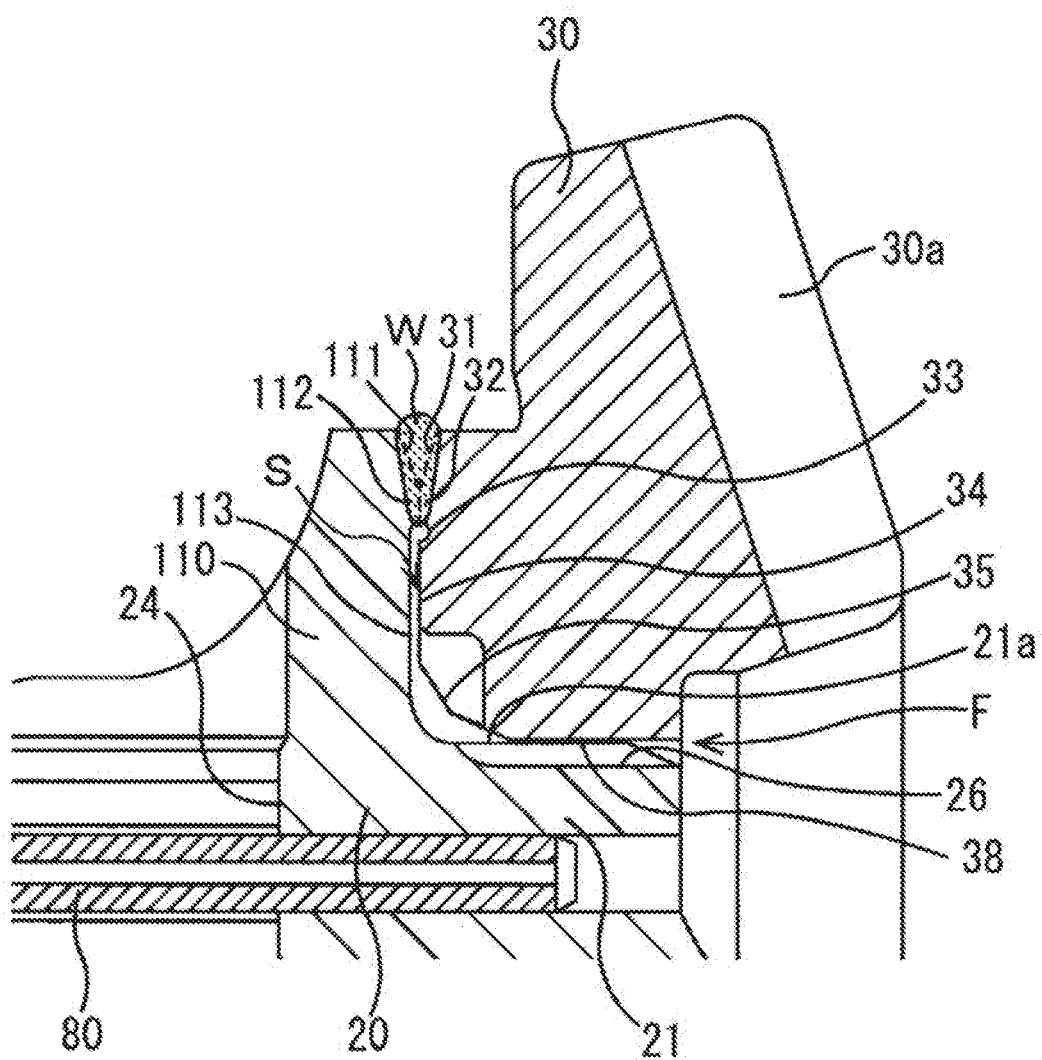
FIG. 2 is a cross-sectional view illustrating the configuration of the joint between a differential case and a ring gear.

Next, the joint between the differential case 20 and the ring gear 30 is described in detail. FIG. 2 is a diagram illustrating a part of the joint between the differential case 20 and the ring gear 30, and illustrates an enlarged view of area X enclosed by the alternate long and short dash line in FIG. 1. In FIG. 2, the shapes of the ring gear 30 and the differential case 20 (a flange 110) before welding are illustrated by the broken line in the welding site W. The cylinder 21 of the differential case 20 is fitted with and press-fitted to the opening 38 of the ring gear 30. When fixing the ring gear 30 to the differential case 20, for example, the ring gear 30 is fitted to the differential case 20 from the right side in FIG. 2, and the ring gear 30 is brought into contact with the flange 110 of the differential case 20. The fitting site F between the differential case 20 and the ring gear 30 is formed substantially entirely around the rotation axis line A. A notch 26 is provided on a part of the outer peripheral surface 21a of the cylinder 21 of the differential case 20 that is to be fitted with the opening 38 of the ring gear 30.

The ring gear 30 has, in a portion facing the flange 110 of the differential case 20, a slope 31, a contact site 32, a space forming concavity 33, a flat 34, and a chamfer 35 in this order from the outer peripheral side. The slope 31 is formed as a surface that becomes farther from the flange 110 with transition from the contact site 32 toward the outer peripheral side. The contact site 32 and the flat 34 may be surfaces present on the same plane, for example. The space forming concavity 33 is provided between the contact site 32 and the flat 34, and is formed as a trench recessed in a direction moving away from the flange 110.

The flange 110 of the differential case 20 has, in a portion facing the ring gear 30, a slope 111, a contact site 112, and a space forming concavity 113 in this order from the outer peripheral side. The slope 111 is formed as a surface that becomes farther from the ring gear 30 with transition from the contact site 112 toward the outer peripheral side. The space forming concavity 113 is provided on the inner peripheral side with respect to the contact site 112, and is formed as a trench recessed in a direction moving away from the ring gear 30.

In a state where the cylinder 21 of the differential case 20 is fitted with and press-fitted to the opening 38 of the ring gear 30, and the contact site 32 of the ring gear 30 and the contact site 112 of the differential case 20 are in contact, a groove G is formed by the slopes 31 and 111 formed on the ring gear 30 and the flange 110, respectively. In this state, a penetration space S is formed by the space forming concavities 33 and 113 formed on the ring gear 30 and the flange 110, respectively.

When the differential case 20 and the ring gear 30 are welded together, a high energy beam such as a laser beam or an electron beam is applied from the outer peripheral side while a filler wire is supplied to the groove G. Thereby, the filler wire and the contact sites 32 and 112 are melted, and the ring gear 30 and the differential case 20 are joined together. At this time, the beam is applied so that the molten metal produced by the melting of the filler wire and the contact sites 32 and 112 reaches the penetration space S; thus, penetration welding is performed. The welding site W between the differential case 20 and the ring gear 30, and the penetration space S mentioned above are formed entirely around the rotation axis line A. In the case where the differential case 20 and the ring gear 30 are welded together over the entire periphery, the base point and the end point of welding are superimposed to form an overlap WOL so that a gap that makes a welding failure does not occur.

The notch 26 as a prescribed mark is provided on, of the outer peripheral surface 21a of the cylinder 21 of the differential case 20 that is to be fitted with the opening 38 of the ring gear 30, a portion in which the cross section illustrated in FIG. 2 is located. The notch 26 is formed as a mark indicating the position of an area of the differential case 20 where the ratio of the pearlite structure having a high carbon equivalent is high (hereinafter, occasionally referred to as a "high pearlite area").

(1-3. Notch (Mark))

Figure 3:
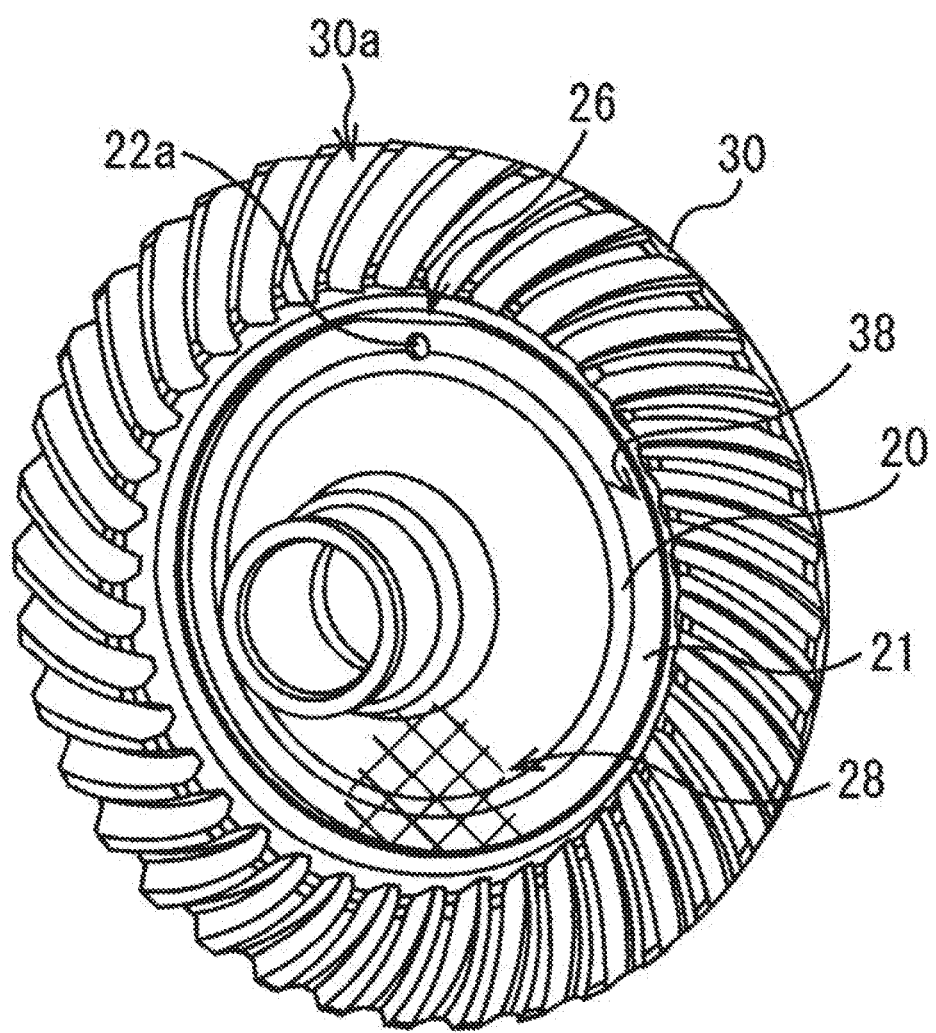
FIG. 3 is an explanatory diagram illustrating a state where the differential case and the ring gear are fitted together.
Figure 4:
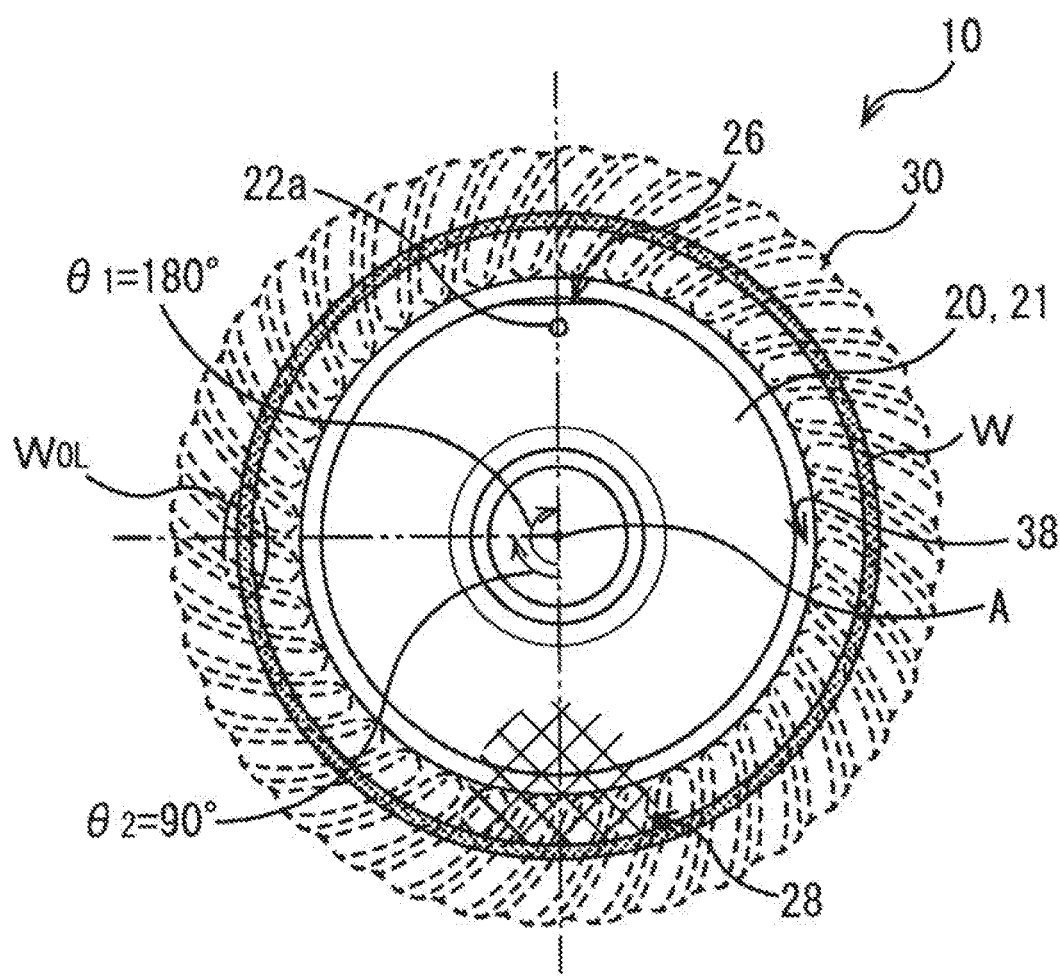
FIG. 4 is an explanatory diagram illustrating an example of the positional relationship between an overlap of welding and a high pearlite area.

Next, the notch 26 provided on the differential case 20 is described in detail. FIG. 3 is a perspective view of the differential device 10 as viewed from the tooth surface 30a side of the ring gear 30. In FIG. 3, the illustration of the differential case 20 located on the opposite side to the tooth surface 30a side of the ring gear 30 is omitted. FIG. 4 is a schematic diagram of the differential device 10 as viewed from the tooth surface 30a side of the ring gear 30 along the rotation axis line A. In FIG. 4, the ring gear 30 is illustrated by the dotted line.

The differential case 20 has the notch 26 on a part of the outer peripheral surface 21a of the cylinder 21 that is to be fitted with the ring gear 30. As illustrated in FIG. 4, in the differential device 10 according to the present example, the notch 26 is formed by a part of the outer peripheral surface 21a of the cylinder 21 in a circular cylindrical shape being recessed toward the rotation axis line A serving as the center axis.

The notch 26 has a function as a mark indicating the position of high pearlite area 28 in the differential case 20. That is, the position of the high pearlite area 28 can be identified from the position of the notch 26. The notch 26 is provided so as to have a previously set specific positional relationship to the high pearlite area 28. For example, in the example illustrated in FIG. 3 and FIG. 4, the notch 26 is provided in such a position that, with the rotation axis line A as the rotation center, the angle 81 between the notch 26 and the central portion of the high pearlite area 28 is approximately 180°.

The high pearlite area 28 can be formed when the differential case 20 is cast using cast iron, for example. Specifically, during the casting of the differential case 20, the cooling rate of cast iron near the gate of the mold is lower than that in other areas, and accordingly the pearlite ratio of the area formed near the gate is higher.

Figure 5:
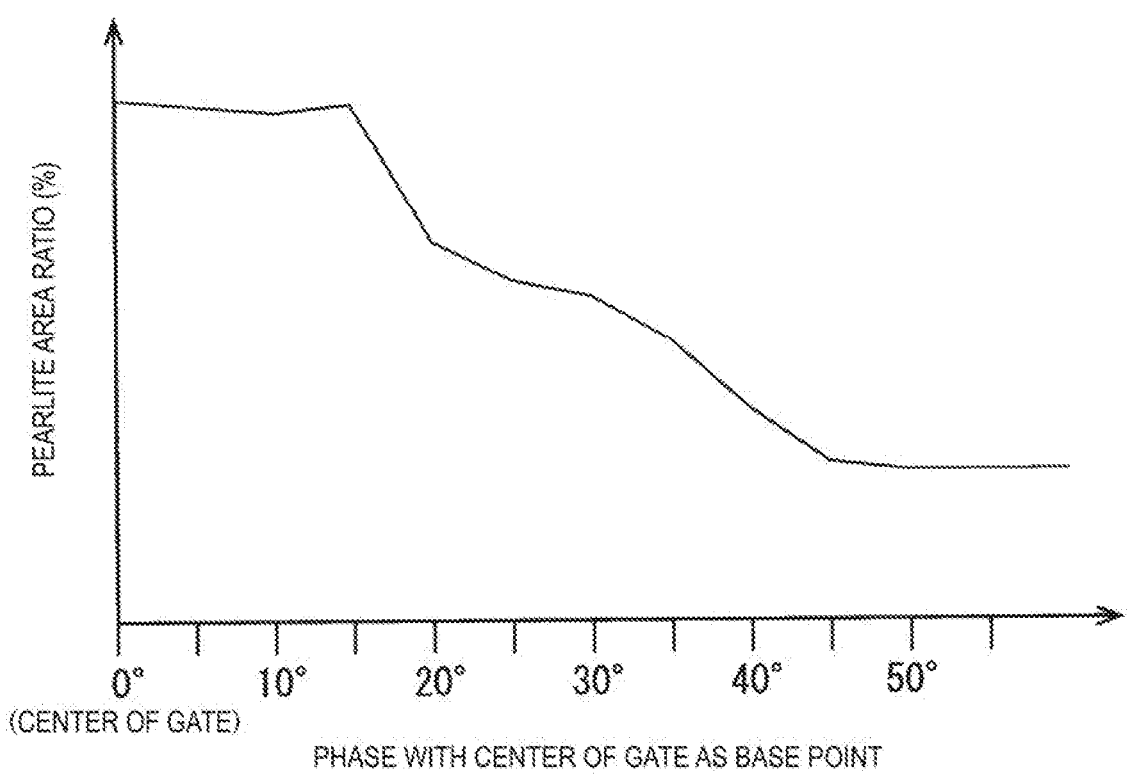
FIG. 5 is an explanatory diagram illustrating the relationship between the gate and the pearlite ratio.

FIG. 5 illustrates the relationship between the gate of the mold and the pearlite ratio of the cast differential case 20. The horizontal axis represents the round-direction position (phase) in a direction around the rotation axis line A of the differential case 20 with, as the base point, a position corresponding to the center position of the gate of the mold, and the vertical axis represents the pearlite area ratio (%) of the area welded in each round-direction position. As illustrated in FIG. 5, the pearlite area ratio of the differential case 20 is high in a position near the gate, and gradually decreases with distance from the vicinity of the gate. In the example illustrated in FIG. 5, a large change in pearlite area ratio is not seen when the phase from the center position of the gate crosses the position of 40°.

The high pearlite area 28 is an area with high brittleness. Although the high pearlite area 28 is not distinguishable at first sight, the presence of the notch 26 having a specific positional relationship to the high pearlite area 28 allows the position of the high pearlite area 28 to be distinguished. In the case where the aim is to distinguish the position of the high pearlite area 28 using the notch 26, the form and size of the notch 26 are not particularly limited. In the case where the aim is to cause the penetration space S to communicate with the outside using the notch 26, the notch 26 may have at least a prescribed length along the axial direction of the cylinder 21.

The differential device 10 according to the present example is manufactured by a method including, when welding the differential case 20 and the ring gear 30 together, a step of holding the differential case 20 on a jig having a positioning site capable of being fitted with the notch 26 and placing the differential case 20 in a prescribed place. Thus, the dimensions of the notch 26 are set to such a degree that the presence or absence of the notch 26 affects whether the differential case 20 can be fitted with the jig.

The notch 26 provided on the differential case 20 of the differential device 10 according to the present example allows the penetration space S partitioned by the welding site W and the fitting site F to communicate with the outside. When the penetration welding described above is performed during the joining of the differential case 20 and the ring gear 30 in the manufacturing of the differential device 10, the gas in the penetration space S expands due to the supplied heat or the generated heat. In the case where the penetration space S is not opened to the outside, the pressure in the penetration space S increases due to the expansion of the gas in the penetration space S, and the gas blows off from part of the molten metal in the welding site W; consequently, a defect of a hole being made in the welding site W may occur.

In contrast, in the differential device 10 according to the present example, the penetration space S is opened to the outside via the notch 26. Therefore, the gas expanding in the penetration space S is released to the outside of the differential case 20 via the notch 26. Thereby, the increase in pressure in the penetration space S is suppressed, and a defect such as a hole being made in the welding site W can be prevented.

Further, as described above, the welding site W between the differential case 20 and the ring gear 30 is provided entirely around the rotation axis line A, and has an overlap WOL where the base point and the end point of welding overlap. The overlap WOL is located in an area different from the high pearlite area 28. For example, in the example illustrated in FIG. 4, the overlap WOL is formed in such a position that, with the rotation axis line A as the rotation center, the angle θ2 between the overlap WOL and the central portion of the high pearlite area 28 is approximately 90°. As described later, the overlap WOL is formed so as not to overlap with the high pearlite area 28, using the notch 26. Thus, the amount of heat input by beam welding to the high pearlite area 28 with relatively high brittleness is suppressed, and the expansion of structure embrittlement from the high pearlite area 28 is suppressed. Thus, the cracking of the differential case 20 can be suppressed.

The positional relationship between the notch 26 and the high pearlite area 28 is not limited to the example of the differential device 10 according to the present example. The angle θ1 between the notch 26 and the central portion of the high pearlite area 28 may be set to an appropriate angle different from 180°, provided that the positional relationship is set in advance. The notch 26 may be formed in the high pearlite area 28. Further, the positional relationship between the overlap WOL and the high pearlite area 28 is not limited to the example of the differential device 10 according to the present example, either. The angle θ2 between the overlap WOL and the central portion of the high pearlite area 28 may be set to an appropriate angle different from 90°, provided that the positions of these are positions different from each other.

<2. Method for Manufacturing Differential Device>

Heretofore, an example of the configuration of the differential device 10 according to the present example is described. Next, a method for manufacturing the differential device 10 according to the present example is described. The method for manufacturing the differential device 10 according to the present example includes a first step of casting a differential case by pouring molten cast iron into, via a gate, a mold having a prescribed mark formation site on its mold surface and a second step of fitting the differential case with a ring gear and welding the differential case and the ring gear together entirely around a prescribed axis. In the second step, the differential case and the ring gear are welded together using a mark formed on the differential case in the first step so that an overlap of welding does not occur in a portion of the differential case formed near the gate of the mold. Each step will now be described in detail.

(2-1. Casting Process (First Step))

Figure 6:
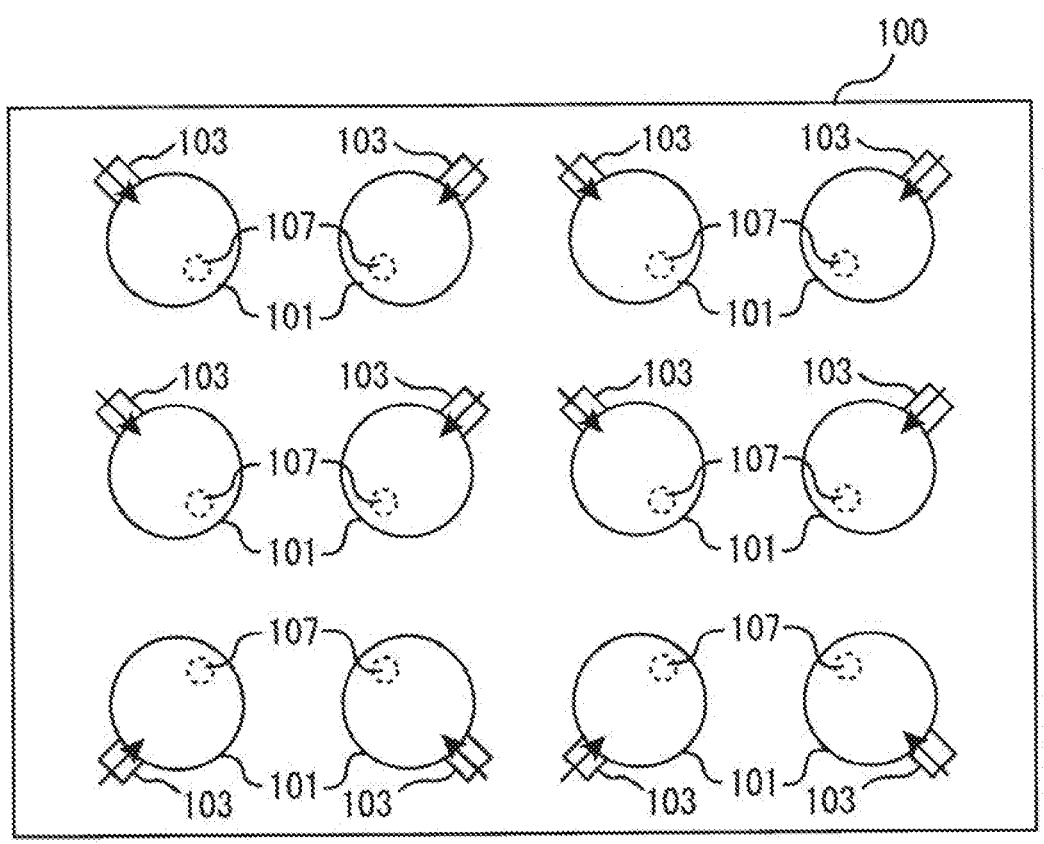
FIG. 6 is an explanatory diagram illustrating an example of the mold used in a casting process.

In the casting process, molten cast iron is poured into, via a gate, a mold having, on its mold surface, a mark formation site that has a specific positional relationship to the gate, and the material of a differential case is cast. FIG. 6 is a schematic diagram for describing a mold 100 that can be used in the casting process. The mold 100 illustrated in FIG. 6 is an example of the mold 100 capable of casting 12 pieces of differential case material 120 simultaneously.

The type of the mold 100 is not particularly limited, and may be a conventionally known mold such as a sand mold or a metal mold. The mold 100 illustrated in FIG. 6 has 12 molding areas 101 into which molten cast iron is poured. The number of molding areas 101 is not limited to 12. Each molding area 101 has a mold surface of a shape corresponding to the external shape of the differential case 20. Each molding area 101 is provided with a gate 103 for pouring molten cast iron. The mold surfaces of the molding areas 101 are formed such that the gate 103 is located in an identical position with respect to the differential case material 120 that is cast in each molding area 101.

Further, each molding area 101 is provided with a mark formation site 107 for forming a mark on the cast differential case material 120. In each molding area 101, the gate 103 and the mark formation site 107 always have a specific positional relationship. The example of the mold 100 illustrated in FIG. 6 is designed such that the rotation phase difference between the gate 103 and the mark formation site 107 with the central portion of the molding area 101 as the center is 180°.

In the differential device 10 according to the present example, the notch 26 as a mark is formed on the outer peripheral surface 21a of the cylinder 21 of the differential case 20; hence, of the mold surface of each molding area 101 of the mold 100, a part of the inner peripheral surface of the cylindrical portion corresponding to the cylinder 21 is pulled out toward the center of the cylindrical shape, and thereby the mark formation site 107 is provided. Here, the welding process of the method for manufacturing the differential device 10 according to the present example includes a step of holding the cylinder 21 of the differential case 20 on a jig having a positioning site capable of being fitted with the notch 26 and placing the differential case 20 in a prescribed place. Thus, the dimensions (the amount of pulling-out) of the mark formation site 107 are set to such a degree that the presence or absence of the notch 26 affects whether the differential case 20 can be fitted with the jig.

Molten cast iron is poured into each molding area 101 of the mold 100 via the gate 103, and the cast iron is solidified by cooling; thereby, the differential case material 120 having the notch 26 as a mark is prepared. An appropriate core may be used during casting.

Figure 7:
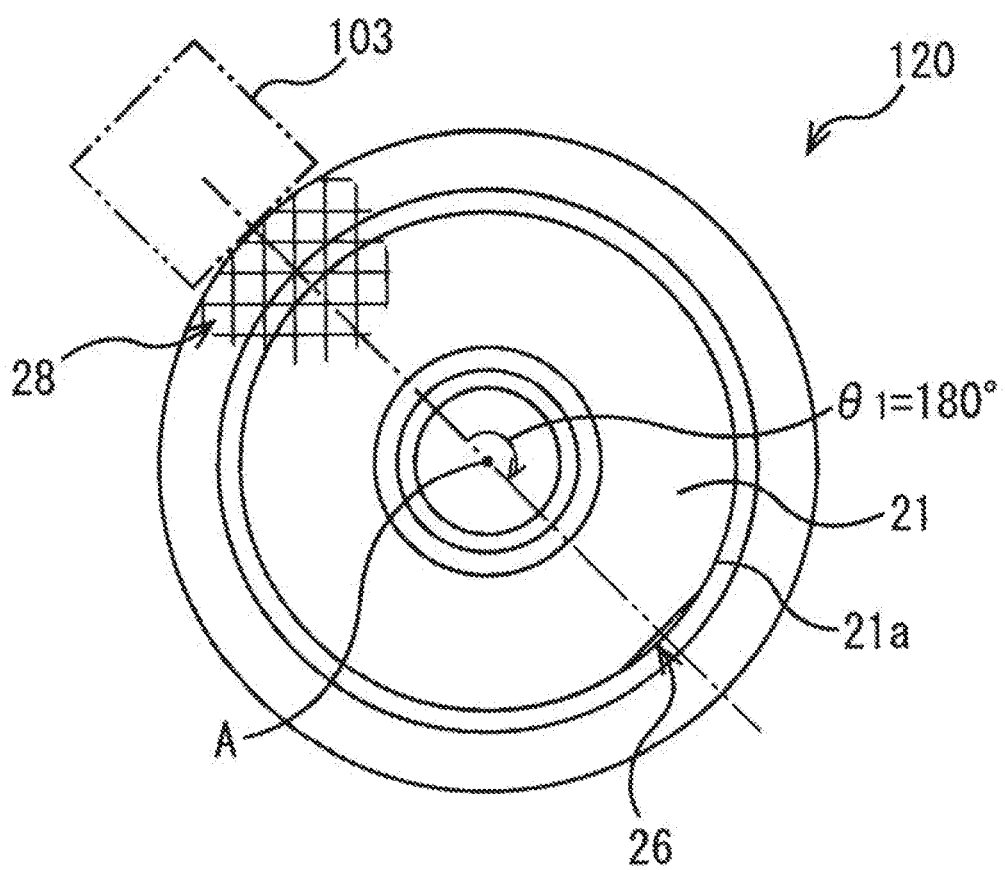
FIG. 7 is an explanatory diagram illustrating an example of the positional relationship between a high pearlite area and a notch of the differential case.

FIG. 7 is an explanatory diagram illustrating the differential case material 120 that can be prepared in the casting process, and is a diagram of the differential case material 120 as viewed from the cylinder 21 side in the axial direction. When the differential case material 120 is cast, the vicinity of the gate 103 continuously receives molten cast iron that is poured in, and therefore has a lower cooling rate of cast iron than other areas. Consequently, a portion of the differential case material 120 formed near the gate 103 forms a high pearlite area 28 with a high pearlite ratio. In the differential case material 120, the notch 26 is formed in a position at a rotation phase of 180° with respect to the high pearlite area 28, with the rotation axis line A as the center. All the pieces of differential case material 120 cast in the molding areas 101 of the mold 100 have a notch 26 having the same positional relationship to the high pearlite area 28.

After the differential case material 120 is cast, appropriate additional processing is performed; thereby, a desired differential case 20 is obtained. For example, the differential case material 120 illustrated in FIG. 7 does not have the pin insertion hole 22a into which the detachment prevention pin 80 having the function of preventing the detachment of the pinion shaft 40 is inserted; hence, the pin insertion hole 22a is formed by additional processing.

(2-2. Welding Process (Second Step))

In the welding process, the differential case 20 is fitted with the ring gear 30, and the differential case 20 and the ring gear 30 are welded together entirely around the rotation axis line A. At this time, the differential case 20 and the ring gear 30 are welded together using the notch 26 as a mark that is formed on the differential case 20 by the mark formation site 107 of the mold 100 so that an overlap of welding does not occur in a portion of the differential case 20 formed near the gate 103 of the mold 100 (the high pearlite area 28).

In the welding process, the differential case 20 is placed in a prescribed place while the placement position of the notch 26 is controlled. After the ring gear 30 is fitted with the cylinder 21 of the differential case 20, beam welding is performed entirely around the outer peripheral portion of the differential case 20 and the ring gear 30, with a position not overlapping with the high pearlite area 28 as the starting position. That is, when the placement position of the notch 26 of the differential case 20 has been found, beam welding can be started from a position different from the high pearlite area 28, which has a specific positional relationship to the notch 26. Thereby, the occurrence of an overlap of welding can be prevented in the high pearlite area 28.

Figure 8:
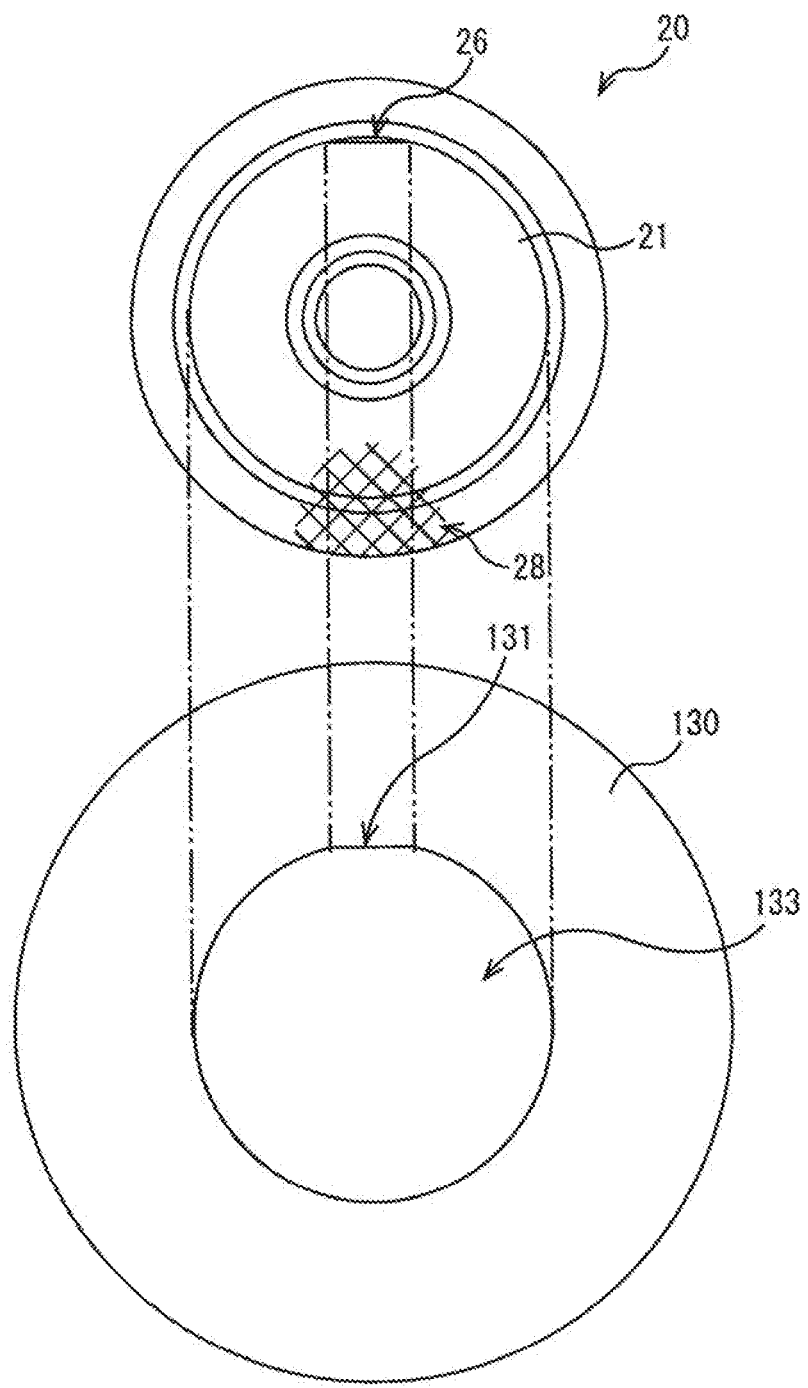
FIG. 8 is an explanatory diagram illustrating an example of the jig used for the placement of the differential case.

FIG. 8 is a schematic diagram illustrating an example of a jig 130 by which the differential case 20 can be placed in a prescribed place while the placement position of the notch 26 is controlled. As illustrated in FIG. 8, the differential case 20 is held by the jig 130 having an opening 133 of a shape corresponding to the external shape of the cylinder 21 of the differential case 20, and the differential case 20 is placed in a prescribed place; thereby, the placement position of the notch 26 can be controlled. Specifically, a positioning site 131 capable of being fitted with the notch 26 of the cylinder 21 of the differential case 20 is provided in a part of the opening 133 of the jig 130. Hence, if the notch 26 and the positioning site 131 are not in the same rotation phase, the differential case 20 cannot be held on the jig 130.

Thus, when the differential case 20 is appropriately held on the jig 130 and is placed in a prescribed place, the position of the notch 26, that is, the position of the high pearlite area 28 can be controlled by the position of the positioning site 131. That is, at the time of placing the differential case 20 on a support that supports it during beam welding, the differential case 20 is placed while being held such that the positioning site 131 of the jig 130 is always located in the same position; thereby, the high pearlite area 28 can be always located in the same position. At this time, the differential case 20 is placed such that the high pearlite area 28 is located in a position different from the starting position of beam welding.

Figure 9:
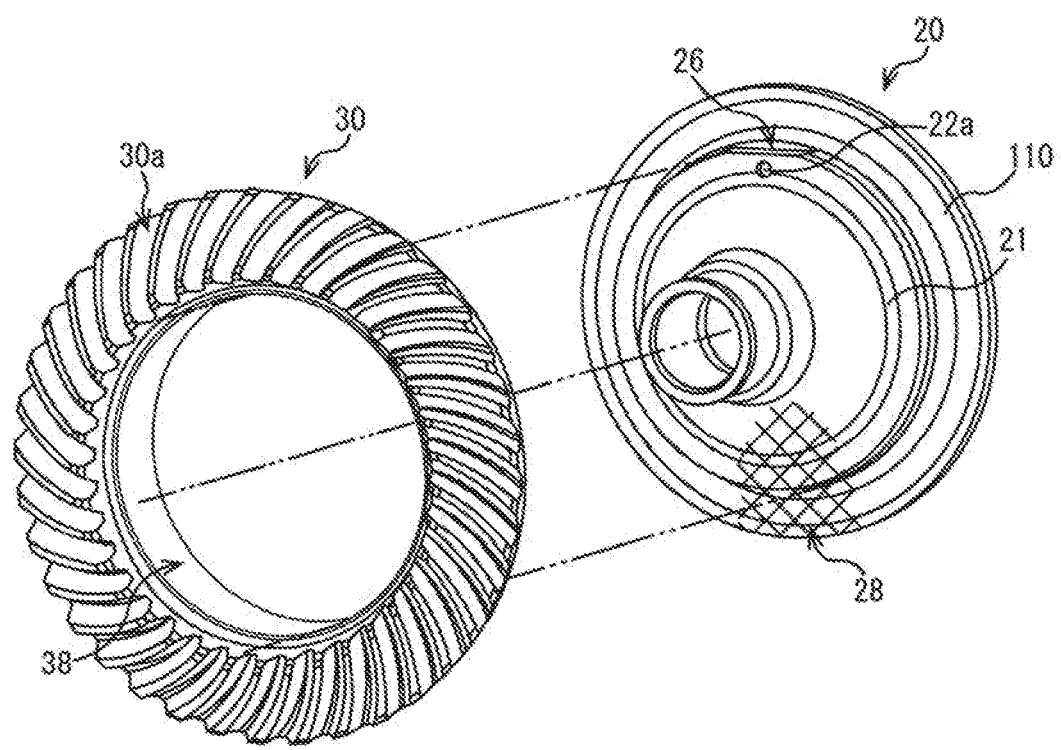
FIG. 9 is an explanatory diagram illustrating a manner of fitting the differential case and the ring gear together.

Subsequently, as illustrated in FIG. 9, the cylinder 21 of the differential case 20 is fitted with the opening 38 of the ring gear 30, and is press-fitted until the ring gear 30 is butted against the flange 110 of the differential case 20. After that, with a position not overlapping with the high pearlite area 28 of the differential case 20 as the starting position, the entire outer peripheral portion of the contact position between the ring gear 30 and the flange 110 of the differential case 20 is beam-welded (see FIG. 4). At this time, since the position of the high pearlite area 28 of the differential case 20 has been previously found in accordance with the position of the notch 26, the high pearlite area 28 can be set in a position different from the starting position of beam welding in advance.

The series of these steps, that is, the step of holding the differential case 20 on the jig 130 to place the differential case 20 in a prescribed place, the step of fitting the differential case 20 and the ring gear 30 together, and the step of beam-welding the differential case 20 and the ring gear 30 together may be executed using a previously programmed apparatus. By the welding process being performed using the apparatus, the welding process can be efficiently performed such that the high pearlite area 28 of the differential case 20 and the overlap WOL of welding of the differential case 20 and the ring gear 30 do not overlap.

After that, while illustration is omitted, the pinion bevel gears, the side bevel gears, the pinion shaft, the detachment prevention pin, etc. are fixed to the differential case 20; thus, the differential device 10 is manufactured.

As described above, in the method for manufacturing the differential device 10 according to the present example, the notch 26 as a mark having a specific positional relationship to the high pearlite area 28, which is difficult to distinguish from the external appearance of the differential case 20, is formed in the casting process. Therefore, a mark by which the position of the high pearlite area 28 can be found is formed without performing an additional process. Furthermore, in the method for manufacturing the differential device 10 according to the present example, in the welding process, beam welding is performed using the notch 26 so as to take a position different from the high pearlite area 28 as the starting position. Thus, the high pearlite area 28 with high brittleness and the overlap WOL of welding do not overlap, and the amount of heat input to the high pearlite area 28 can be suppressed. Thereby, the cracking of the differential case 20 in the differential device 10 caused by excessively large heat input can be suppressed.

Furthermore, in the method for manufacturing the differential device 10 according to the present example, in the welding process, the differential case 20 is held using the jig 130 having the positioning site 131 capable of being fitted with the notch 26 provided on the outer peripheral surface 21a of the cylinder 21 of the differential case 20, and the differential case 20 is placed in a prescribed place. At this time, the differential case 20 is placed such that the position of the notch 26, that is, the position of the high pearlite area 28 of the differential case 20 is a previously set position, and the starting position of beam welding can be set to a position different from the high pearlite area 28 in advance. Thus, the welding process is efficiently performed such that the overlap WOL of welding and the high pearlite area 28 do not overlap, and the differential device 10 can be efficiently manufactured.

Although the preferred examples of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

For example, although in the above example the notch 26 as a mark is provided on the outer peripheral surface 21a of the cylinder 21 of the differential case 20, the present invention is not limited to this example. For example, in the case where a path that allows the penetration space S partitioned by the welding site W and the fitting site F to communicate with the outside is ensured without using a notch, the mark may not be a notch provided on the outer peripheral surface 21a. For example, the mark may be a protrusion or marking. However, in the case where a protrusion is formed as the mark, the mark is preferably formed in a place other than a position that can constitute a part of the welding site W or the fitting site F.

The invention claimed is:

1. A method for manufacturing a differential device, comprising:
a first step of casting a differential case by pouring molten cast iron into, via a gate, a mold having, on a mold surface, a mark formation site that has a specific positional relationship to the gate; and
a second step of fitting the differential case with a ring gear and welding the differential case and the ring gear together entirely around a prescribed axis,
wherein, in the second step, the differential case and the ring gear are welded together using a mark formed on the differential case within the mark formation site in the first step so that an overlap of welding does not occur in an area where a pearlite ratio is higher in the differential case.

2. The method for manufacturing the differential device according to claim 1, wherein, in the second step, the differential case is placed using the mark so that the area where the pearlite ratio is higher is located in a specific position different from a starting position of the welding.

3. The method for manufacturing the differential device according to claim 2,
wherein the mark is a notch provided on a part of an outer peripheral surface of a cylinder of the differential case to be fitted with the ring gear, and
in the second step, the differential case is held by a jig having a positioning site capable of being fitted with the notch and the differential case is placed in a prescribed place, and thereby the area where the pearlite ratio is higher is located in the specific position different from the starting position of the welding.

4. A differential device, comprising:
a differential case made of a casting containing cast iron as a main component; and
a ring gear that has an opening with which a cylinder of the differential case is fitted and is welded with the differential case entirely around a prescribed axis,
wherein, in the differential case, a pearlite ratio is higher in a partial area in a round direction of the cylinder than in another area, and the differential case has a mark having a specific positional relationship to the partial area where the pearlite ratio is higher, and
an overlap where a base point and an end point of a welding overlap is located in an area different from the area where the pearlite ratio is higher.

5. The differential device according to claim 4, wherein the mark is a notch provided on a part of an outer peripheral surface of the cylinder.

6. The differential device according to claim 5,
wherein a space is provided between a fitting site where the differential case and the ring gear are fitted together and a welding site where the differential case and the ring gear are welded together, and
the space communicates with an outside of the differential case via the notch as the mark.

* * * * *